United States Patent
Wu

(10) Patent No.: US 9,908,459 B2
(45) Date of Patent: Mar. 6, 2018

(54) LED FOG LAMP

(71) Applicant: COPLUS Inc., New Taipei (TW)

(72) Inventor: Jacob Wu, Tainan (TW)

(73) Assignee: COPLUS INC., New Taipei (TW)

( * ) Notice: Subject to any disclaimer, the term of this patent is extended or adjusted under 35 U.S.C. 154(b) by 22 days.

(21) Appl. No.: 15/252,011

(22) Filed: Aug. 30, 2016

(65) Prior Publication Data

US 2017/0349087 A1    Dec. 7, 2017

(30) Foreign Application Priority Data

Jun. 6, 2016  (TW) .............................. 105117812 A

(51) Int. Cl.
*F21V 9/00* (2015.01)
*B60Q 1/20* (2006.01)
*F21S 8/10* (2006.01)
*F21Y 115/10* (2016.01)

(52) U.S. Cl.
CPC .............. *B60Q 1/20* (2013.01); *F21S 48/115* (2013.01); *F21S 48/1225* (2013.01); *F21S 48/1241* (2013.01); *F21S 48/145* (2013.01); *F21S 48/328* (2013.01); *F21S 48/33* (2013.01); *F21Y 2115/10* (2016.08)

(58) Field of Classification Search
CPC ......... B60Q 1/26; F21S 48/115; F21S 48/145; F21S 48/1241; F21S 48/328; F21S 48/1225; F21S 48/33; F21Y 2115/10
See application file for complete search history.

(56) References Cited

U.S. PATENT DOCUMENTS

| 6,493,882 B1* | 12/2002 | Steele | A42B 3/0426 2/422 |
| 2014/0029291 A1* | 1/2014 | Chu | F21S 6/002 362/565 |
| 2016/0146423 A1* | 5/2016 | Lai | F21S 48/328 362/520 |

FOREIGN PATENT DOCUMENTS

TW         M520605         4/2016

* cited by examiner

*Primary Examiner* — Ali Alavi

(74) *Attorney, Agent, or Firm* — DLA Piper LLP (US)

(57) ABSTRACT

An LED fog lamp includes a lamp seat and a light-emitting unit. The lamp seat includes a main housing defining a light cavity with a rear opening, and a lampshade mounted to and covering a front side of the main housing. The light-emitting unit includes a heat-dissipating seat having a mounting portion extending into the light cavity via the rear opening, and a light-emitting module mounted on the mounting portion. A light guide unit is mounted inside the light cavity. A positioning mechanism includes a first aligning member disposed on the main housing, a second aligning member disposed on the heat-dissipating seat, and a positioning member detachably interconnecting the first and second aligning members.

7 Claims, 5 Drawing Sheets

LED FOG LAMP

CROSS REFERENCE TO RELATED APPLICATION

This application claims priority of Taiwanese Patent Application Number 105117812, filed on Jun. 6, 2016.

FIELD

The disclosure relates to a vehicular lamp, more particularly to an LED fog lamp that is mounted on a front side of a vehicle, that can improve traffic safety and that can be easily repaired.

BACKGROUND

Fog lamps are mounted on both sides of the front of the vehicle to improve traffic safety. Since the light beam emitted from the fog lamp must comply with the rules and regulations to enhance traffic safety, during manufacture of a conventional fog lamp, it usually includes a heat-dissipating seat, a lampshade connected to a front side of the heat-dissipating seat, and a light-emitting unit mounted on the heat-dissipating seat for emitting light. The light-emitting unit generally includes a light-emitting member and a light-blocking plate. Although the conventional fog lamp can achieve its intended purpose, the entire structure thereof cannot be disassembled. When one of the components is damaged, the whole fog lamp must be replaced with a new one, thereby increasing the repair cost of the conventional fog lamp.

To overcome the aforesaid drawback of the conventional fog lamp, the applicant has developed a fog lamp, as disclosed in Taiwanese Utility Model Number M520605, which includes a light-emitting module disposed on a heat-dissipating seat. The heat-dissipating seat is detachably connected to a rear side of a lamp seat. Through this, replacement of the light-emitting module can be facilitated. Although the disclosed fog lamp can achieve its intended purpose, because the light-emitting module is mounted on the heat-dissipating seat which is rotatably connected to the lamp seat, when the connection between the heat-dissipating seat and the lamp seat loosens due to vibration of the vehicle such that an assembled angle thereof deviates, the fog lamp cannot emit a correct light beam according to the road rule, thereby causing danger during driving.

SUMMARY

Therefore, an object of the disclosure is to provide an LED fog lamp that can permit convenient repair of components thereof, that can reduce repair cost, and that can emit correct light beam according to the road rule after assembly.

According to this disclosure, an LED fog lamp comprises a lamp seat, a light-emitting unit, a light guide unit and a positioning mechanism. The lamp seat includes a main housing, and a lampshade mounted to and covering a front side of the main housing. The main housing includes a housing wall that surrounds a central axis and that defines a light cavity. The light cavity has a rear opening. The light-emitting unit includes a heat-dissipating seat detachably and rotatably mounted on the main housing and having a mounting portion extending into the light cavity via the rear opening, and a light-emitting module mounted on the mounting portion. The light guide unit is mounted inside the light cavity. The positioning mechanism includes a first aligning member disposed on the main housing, a second aligning member disposed on the heat-dissipating seat, and a positioning member detachably interconnecting the first and second aligning members.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
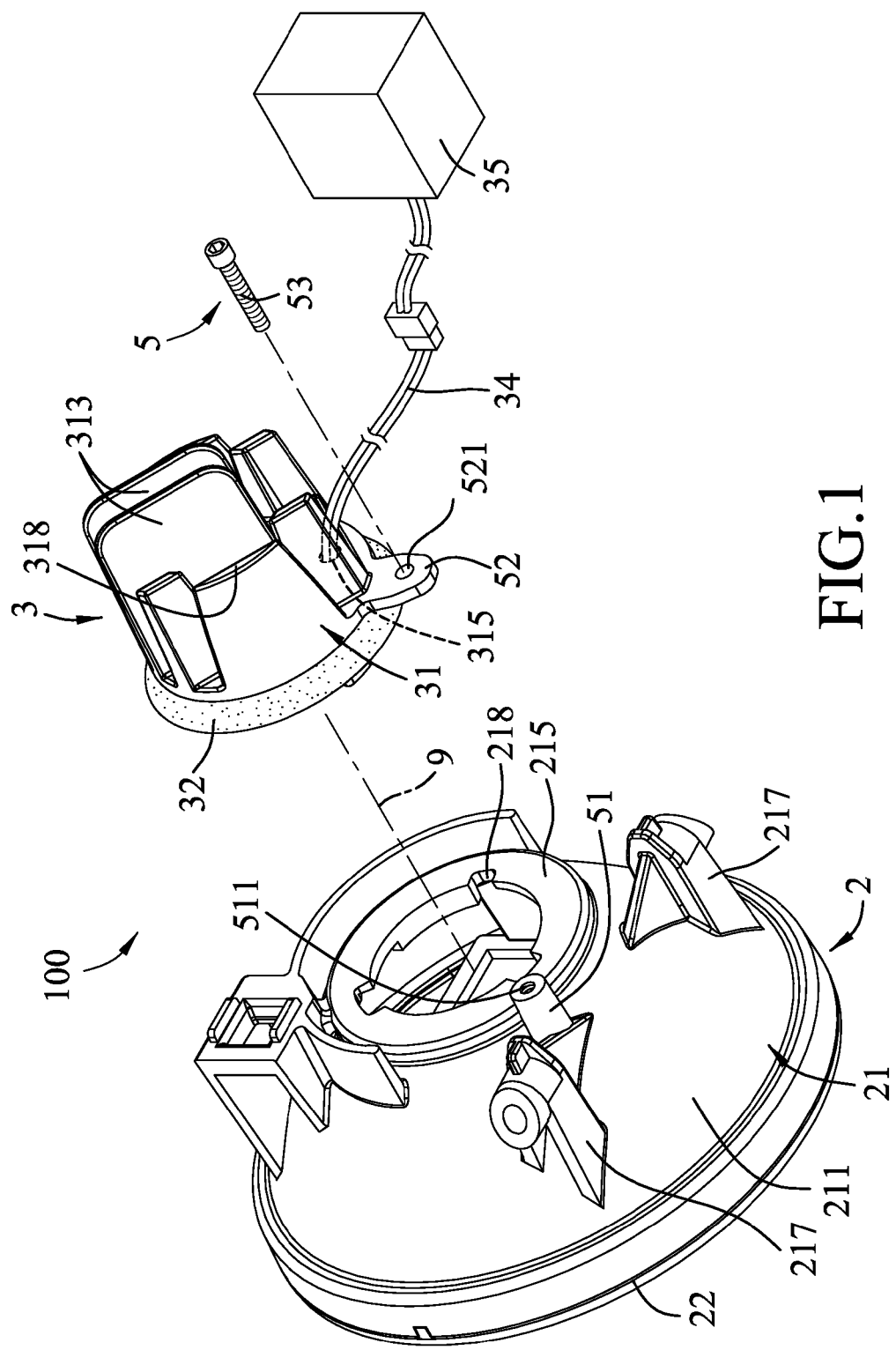
FIG. 1 is a rear exploded perspective view of an LED fog lamp according to the embodiment of the present disclosure.
Figure 2:
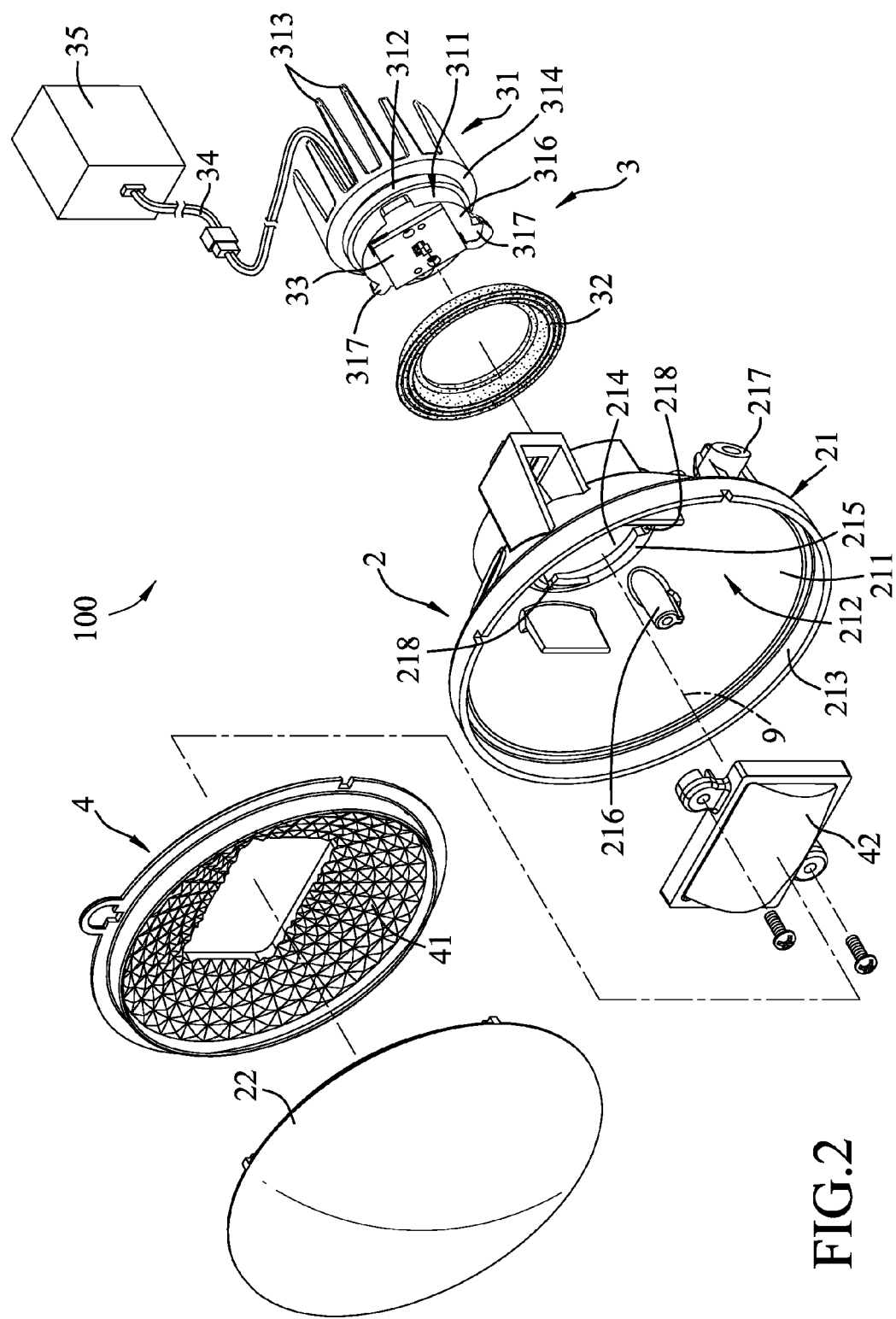
FIG. 2 is a front exploded perspective view of the embodiment.

Referring to FIGS. 1 to 5, an LED (light-emitting diode) fog lamp 100 according to the embodiment of the present disclosure is configured to be mounted on a component of a vehicle (not shown), such as a bumper, and is shown to comprise a lamp seat 2, a light-emitting unit 3, a light guide unit 4, and a positioning mechanism 5.

The lamp seat 2 is configured to be mounted on the component of the vehicle, and includes a main housing 21, and a lampshade 22 mounted to and covering a front side of the main housing 21 for permitting light to pass therethrough. The main housing 21 includes a housing wall 211 surrounding a central axis 9 and having a conical shape, and a light cavity 212 defined by the housing wall 211. The light cavity 212 has a front opening 213 proximate to the lampshade 22, and a rear opening 214 formed in a rear portion of the housing wall 21 and opposite to and spaced apart from the front opening 213.

The main housing 21 further includes an annular engaging projection 215 projecting from a wall that defines the rear opening 214 toward the central axis 9, two posts 216 protruding from an inner surface of the housing wall 211 at two diametrically opposite sides of the rear opening 214 toward the light cavity 212, and two angularly spaced-apart fixing projections 217 extending outwardly from an outer surface of the housing wall 211 in proximity to the rear opening 214 for connection with the component of the vehicle. The annular engaging projection 215 has a plurality of angularly spaced-apart engaging notches 218 surrounding the central axis 9 and having different circumferential widths.

The light-emitting unit 3 includes a heat-dissipating seat 31, a waterproof gasket 32, a light-emitting module 33, a controller 35, and an electrical wire 34. The heat-dissipating seat 31 is detachably and rotatably mounted on the main housing 21, and includes a mounting portion 311 extending into the light cavity 212 via the rear opening 214 and having opposite front and rear surfaces 316, 318, an annular protrusion 312 extending outwardly and radially from an intermediate periphery of the mounting portion 311 and located externally of the light cavity 212, an annular flange 314 extending outwardly and radially from the intermediate periphery of the mounting portion 311 and spaced apart from the annular protrusion 312, a plurality of heat-dissipating fins 313 extending rearwardly from the annular flange 314 and the rear surface 318 of the mounting portion 311, a through hole 315 extending through the front and rear surfaces 316, 318 for extension of the electrical wire 34 therethrough, and a plurality of angularly spaced-apart engaging lugs 317 extending outwardly and radially from an upper periphery of the mounting portion 311. The engaging lugs 317 have widths that match the circumferential widths of the respective engaging notches 218, are removably extendable through the respective engaging notches 218, and are abuttable against a front side of the annular engaging projection 215.

The waterproof gasket 32 is sleeved on the intermediate periphery of the mounting portion 311, and abuts between the annular flange 314 and a rear side of the annular engaging projection 215. The light-emitting module 33 is mounted on the front surface 316, and includes a circuit board 331, and at least one light-emitting diode 332 mounted on the circuit board 331. The electrical wire 34 extends through the through hole 315, and is electrically connected between the circuit board 331 and the controller 35. The light guide unit 4 of this embodiment converts light emitted from the light-emitting diode 332 into fog light, and includes a light-blocking seat 41 mounted inside the light cavity 212, and a transparent lens seat 42 that is connected to and disposed between the posts 216, that is inserted into the light-blocking seat 41 through a rear portion thereof, and that is located in front of the light-emitting module 33. Since the cooperation among the light-blocking seat 41, the transparent lens seat 42 and the light-emitting module 33 to produce fog light is not an important aspect of this disclosure, a detailed description thereof is omitted herein.

Figure 3:
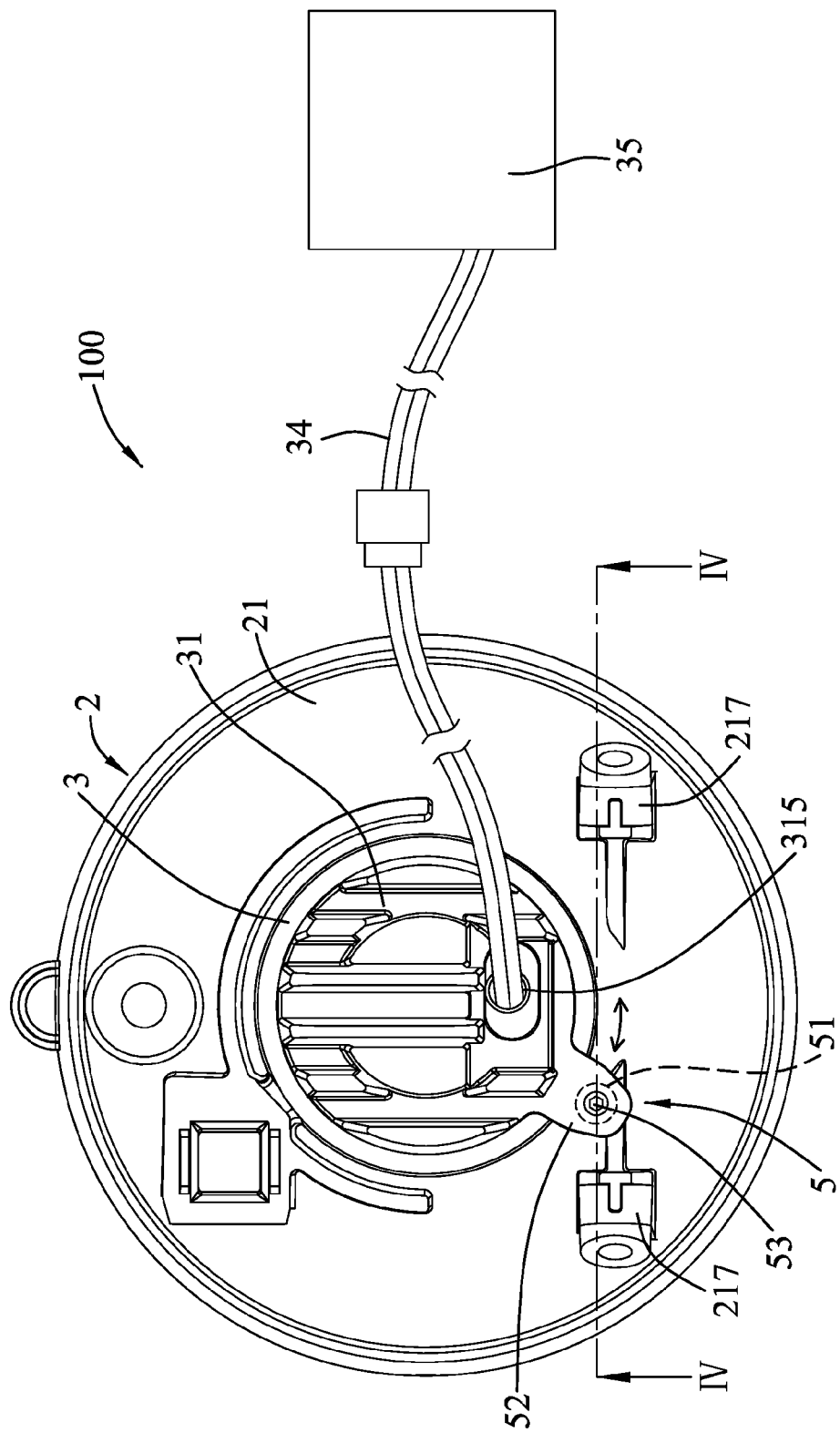
FIG. 3 is a rear schematic view of the embodiment in an assembled state.
Figure 4:
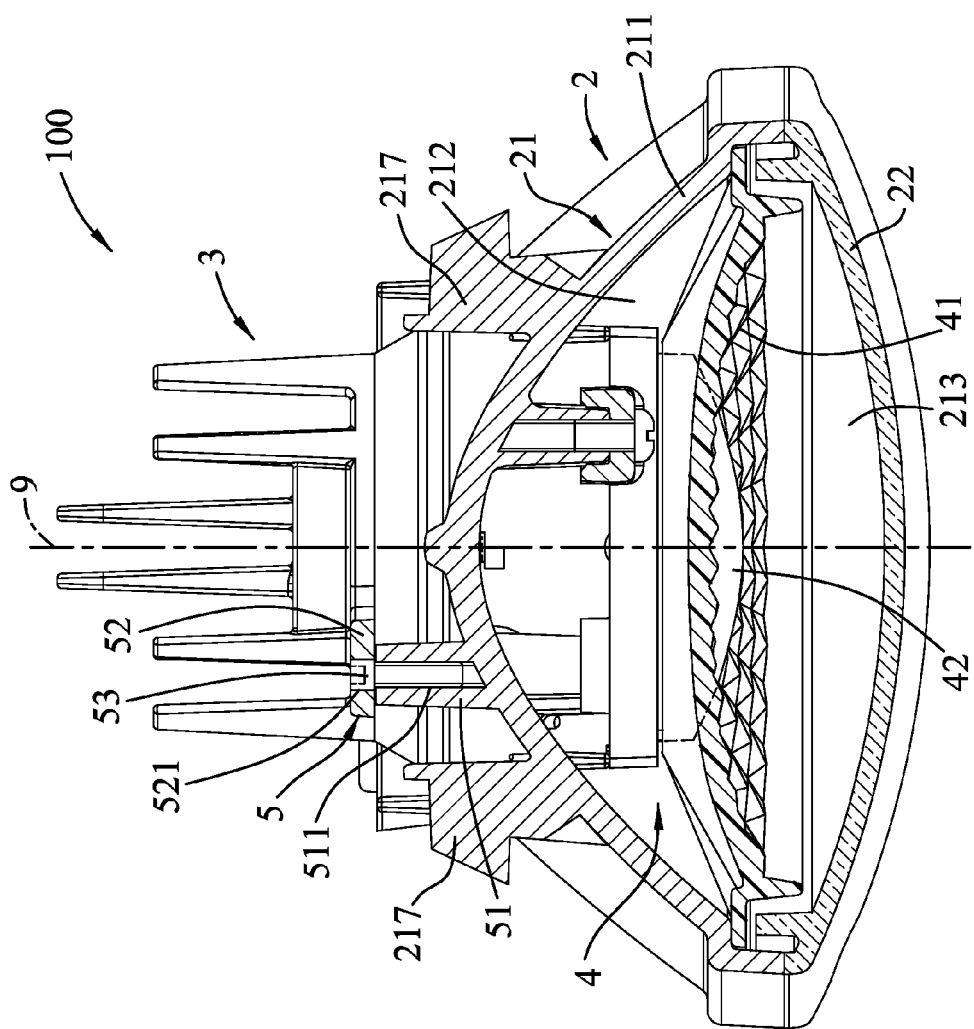
FIG. 4 is a sectional view of the embodiment taken along line IV-IV of FIG. 3.
Figure 5:
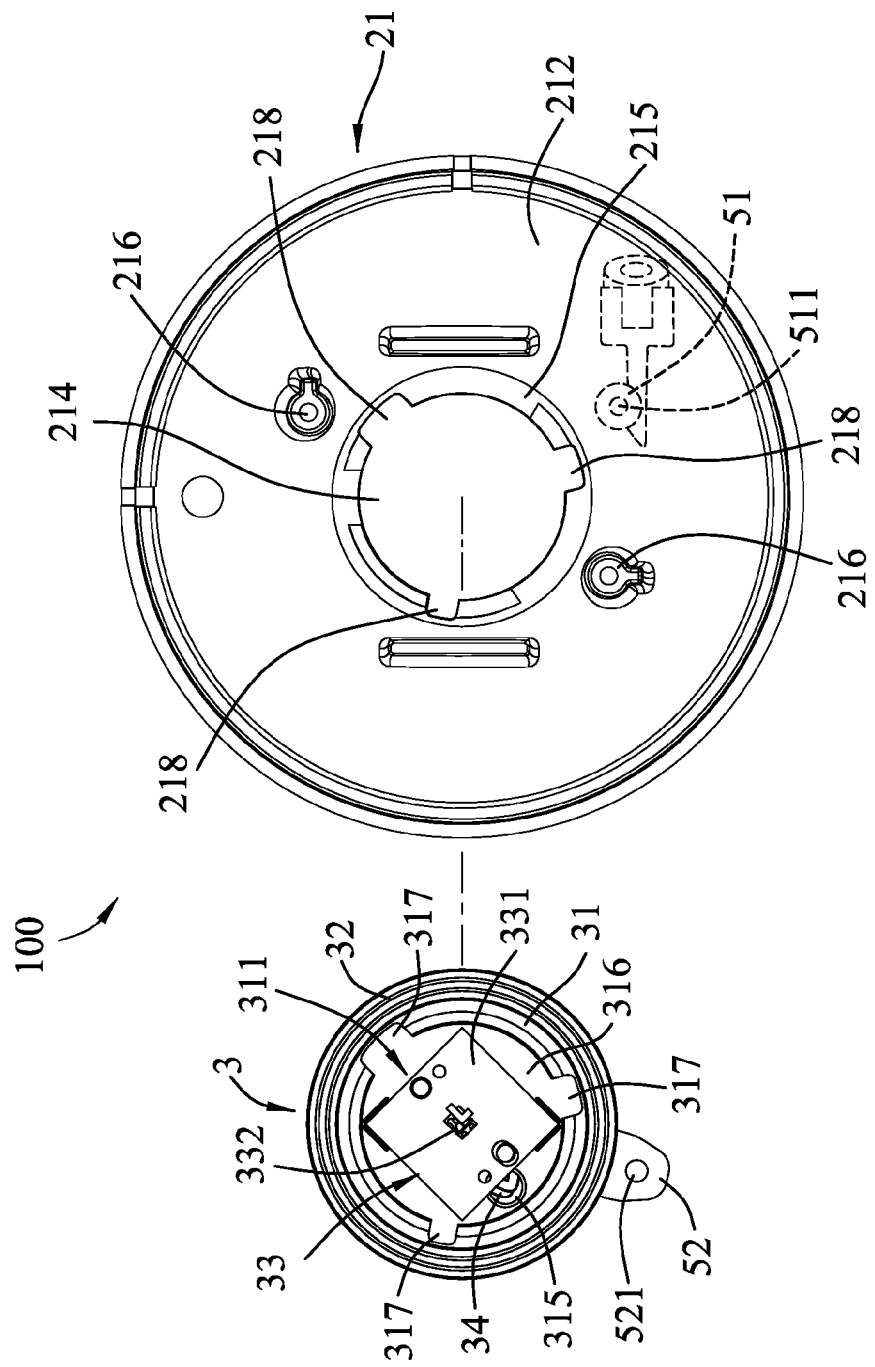
FIG. 5 is a front exploded view of a main housing and a light-emitting unit of the embodiment.

With reference to FIGS. 1, 3 and 4, the positioning mechanism 5 of this embodiment is used to position the heat-dissipating seat 31 on the main housing 21, and includes a first aligning member 51, a second aligning member 52 and a positioning member 53. The first aligning member 51 is in the form of a protruding stud that protrudes rearwardly and integrally from the outer surface of the housing wall 211, that is proximate to the rear opening 214 and one of the fixing projections 217, and that is parallel to the central axis 9. The second aligning member 52 is in the form of an ear that protrudes outwardly, radially and integrally from an outer periphery of the annular flange 314. The positioning member 53 is in the form of a threaded bolt that detachably interconnects the first and second aligning members 51, 52. In this embodiment, the first aligning member 51 has a first positioning hole 511 that opens rearwardly, the second aligning member 52 has a second positioning hole 521 alignable with the first aligning member 51, and the positioning member 53 is insertable through the second positioning hole 521 to threadedly engage the first positioning hole 511.

To assemble the LED fog lamp 100 of this embodiment, the transparent lens seat 41 is first inserted into the light-blocking seat 41, after which the assembled light guide unit 4 is mounted inside the light cavity 212, and the lampshade 22 is mounted on the front side of the main housing 21 to cover the front opening 213 of the light cavity 212. The light guide unit 4 and the main housing 21 are connected to form a complete structural body. On the other hand, the light-emitting module 33 is mounted on the front surface 316 of the mounting portion 311 of the heat-dissipating seat 31 to complete another independent structural body. The electrical wire 34 has one end electrically connected to the light-emitting module 33, and another end extending through the through hole 315 and electrically connected to the controller 35.

Next, the engaging lugs 317 of the heat-dissipating seat 31 are inserted through the respective engaging notches 218, and the light-emitting unit 3 is rotated in a first direction to place the LED fog lamp 100 in a mounting position, in which the engaging lugs 317 are moved away from the respective engaging notches 218 and are moved to abut against the front side of the engaging projection 215. Further, in the mounting position, the second aligning member 52 is aligned with the first aligning member 51. The positioning member 53 is then inserted through the second positioning hole 521, and threadedly engages the first positioning hole 511, thereby positioning the heat-dissipating seat 31 to the main housing 21.

When the LED fog lamp 100 is in the mounting position, not only the engaging lugs 317 abuttingly engage the front side of the engaging projection 215, but also the light-emitting diode 332 is aligned with the light guide unit 4. Thus, light emitted from the light-emitting diode 332 can pass through the light guide unit 4 to convert into fog light with the correct light beam according to the road rule.

Referring back to FIGS. 1 and 5, when the light-emitting diode 332 or the entire light-emitting module 33 is damaged, the positioning member 53 is first detached from the first and second aligning members 51, 52, after which the light-emitting unit 3 is rotated in a second direction opposite to the first direction to move the engaging lugs 317 away from the front side of the engaging projection 215 and align with the respective engaging notches 218. The entire light-emitting unit 3 can then be easily detached and separated from the main housing 21, and the damaged light-emitting module 33 or the damaged light-emitting diode 332 can be repaired or replaced with a new one. After the repair or replacement, the light-emitting unit 3 is connected back to the main housing 21, and is rotated to move the engaging lugs 317 to abut against the front side of the engaging projection 215. The positioning member 53 is then connected to the first and second aligning members 51, 52. Hence, the repair or replacement operation of the LED fog lamp 100 of this disclosure is easily accomplished. If the controller 35 is damaged, the end of the electrical wire 34, which is connected to the controller 35 and which is located externally of the main housing 21, is simply disconnected and separated from the controller 35.

In sum, because the light-emitting diode 332 is a consumable item which may be damaged after using it for a certain period of time, and the circuit board 331 and the controller 35 may also be damaged, only the damaged component is removed and repaired or replaced with a new one, so that the repair or replacement cost can be reduced. Further, the damaged component can be easily disassembled and assembled. Moreover, during repair or replacement of the component, as long as the first and second aligning members 51, 52 are aligned, after which the positioning member 53 is connected to the two, the correct position of the light-emitting unit 3 after rotation is ensured, so that the LED fog lamp 100 can emit correct light beam. Therefore, the object of this disclosure can be realized.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the most practical embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An LED fog lamp comprising:
a lamp seat including a main housing, and a lampshade mounted to and covering a front side of said main housing, said main housing including a housing wall that surrounds a central axis and that defines a light cavity, said light cavity having a rear opening;
a light-emitting unit including a heat-dissipating seat detachably and rotatably mounted on said main housing and having a mounting portion extending into said light cavity via said rear opening, and a light-emitting module mounted on said mounting portion;
a light guide unit mounted inside said light cavity; and
a positioning mechanism including a first aligning member disposed on said main housing, a second aligning member disposed on said heat-dissipating seat, and a positioning member detachably interconnecting said first and second aligning members.

2. The LED fog lamp as claimed in claim 1, wherein:
said first aligning member protrudes rearwardly and integrally from said housing wall, is parallel to the central axis, and has a first positioning hole;
said second aligning member protrudes outwardly and integrally from said heat-dissipating seat, and has a second positioning hole aligned with said first positioning hole when said heat-dissipating seat is mounted on said main housing; and
said positioning member is inserted through said second positioning hole and threadedly engages said first positioning hole to position said heat-dissipating seat on said main housing.

3. The LED fog lamp as claimed in claim 2, wherein said heat-dissipating seat further has an annular protrusion extending outwardly and radially from said mounting portion and located externally of said light cavity, and a through hole extending through said mounting portion, said light-emitting unit further including a controller, and an electrical wire extending through said through hole and electrically connected between said controller and said light-emitting module.

4. The LED fog lamp as claimed in claim 3, wherein said main housing further includes an annular engaging projection projecting from a wall that defines said rear opening toward the central axis, said annular engaging projection having a plurality of angularly spaced-apart engaging notches, said heat-dissipating seat further having a plurality of angularly spaced-apart engaging lugs removably extendabe through said engaging notches, respectively, and abuttable against a front side of said annular engaging projection.

5. The LED fog lamp as claimed in claim 4, wherein said engaging notches have different circumferential widths, and said engaging lugs have widths that match the circumferential widths of said engaging notches, respectively.

6. The LED fog lamp as claimed in claim 4, wherein said heat-dissipating seat further has a plurality of heat-dissipating fins extending rearwardly from said mounting portion, and said light-emitting unit further includes a waterproof gasket disposed on said mounting portion and abutting against a rear side of said annular engaging projection.

7. The LED fog lamp as claimed in claim 1, wherein said light guide unit includes a light-blocking seat mounted inside said light cavity, and a transparent lens seat inserted into said light-blocking seat and located between said light-emitting module and said lampshade.

* * * * *